(12) United States Patent
Sip

(10) Patent No.: US 9,256,262 B2
(45) Date of Patent: Feb. 9, 2016

(54) ELECTRONIC SYSTEMS AND PERFORMANCE CONTROL METHODS

(75) Inventor: Kim Yeung Sip, Taipei Hsien (TW)

(73) Assignee: ACER INCORPORATED, Taipei Hsien (TW)

( * ) Notice: Subject to any disclaimer, the term of this patent is extended or adjusted under 35 U.S.C. 154(b) by 735 days.

(21) Appl. No.: 13/603,285

(22) Filed: Sep. 4, 2012

(65) Prior Publication Data

US 2013/0060398 A1    Mar. 7, 2013

(30) Foreign Application Priority Data

Sep. 5, 2011    (TW) .............................. 100131877 A

(51) Int. Cl.
*G06F 1/26*    (2006.01)
*G06F 13/40*    (2006.01)
*G06F 13/42*    (2006.01)
*G06F 1/20*    (2006.01)

(52) U.S. Cl.
CPC ................ *G06F 1/266* (2013.01); *G06F 1/206* (2013.01); *G06F 13/4095* (2013.01); *G06F 13/4247* (2013.01); *Y02B 60/1228* (2013.01); *Y02B 60/1235* (2013.01); *Y02B 60/1275* (2013.01)

(58) Field of Classification Search
CPC ..... G06F 1/206; G06F 1/266; G06F 13/4095; G06F 13/4247; Y02B 60/1228; Y02B 60/1235; Y02B 60/1275
See application file for complete search history.

(56) References Cited

U.S. PATENT DOCUMENTS

| | | | |
|---|---|---|---|
| 7,418,608 B2 * | 8/2008 | Kumar et al. ................. | 713/320 |
| 8,417,864 B2 | 4/2013 | Sun et al. | |
| 2004/0163001 A1 | 8/2004 | Bodas | |
| 2008/0005516 A1 * | 1/2008 | Meinschein et al. .......... | 711/165 |
| 2009/0016137 A1 | 1/2009 | Hur et al. | |
| 2009/0055665 A1 * | 2/2009 | Maglione et al. ............. | 713/320 |

FOREIGN PATENT DOCUMENTS

| | | |
|---|---|---|
| CN | 101441506 | 5/2009 |
| TW | 200304061 | 9/2003 |
| TW | 200945029 | 11/2009 |
| TW | 201122832 | 7/2011 |

OTHER PUBLICATIONS

Chinese language office action dated Sep. 29, 2014.
English language translation of abstract of CN 101441506 (published May 27, 2009).
Taiwanese language office action dated Dec. 4, 2013.
English language translation of abstract of TW 200304061 (published Sep. 16, 2003).
English language translation of abstract of TW 200945029 (published Nov. 1, 2009).
English language translation of abstract of TW 201122832 (published Jul. 1, 2011).

* cited by examiner

*Primary Examiner* — Thuan Du
(74) *Attorney, Agent, or Firm* — McClure, Qualey & Rodack, LLP

(57) ABSTRACT

An electronic device is provided, including a plurality of electronic devices and a control module. The electronic devices are connected in a daisy-chain configuration and overlapped in a direction, in which the electronic devices use a transport protocol compatible with a thunderbolt interface to communicate with a host. The control module generates thermal designed power values corresponding to the electronic devices according to parameters of the electronic devices and controls performances of the electronic devices according to the thermal designed power values.

13 Claims, 6 Drawing Sheets

ELECTRONIC SYSTEMS AND PERFORMANCE CONTROL METHODS

CROSS REFERENCE TO RELATED APPLICATIONS

This Application claims priority of Taiwan Patent Application No. 100131877, filed on Sep. 5, 2011, the entirety of which is incorporated by reference herein.

BACKGROUND OF THE INVENTION

1. Field of the Invention

The present invention relates to electronic systems, and in particular relates to electronic systems having thunderbolt interfaces.

2. Description of the Related Art

Recently, computers and networks make many innovative functions more effective. New peripheral devices, such as internet units and external storage unites, can easily be connected to computers or notebooks. However, the management of the performance (power) and temperature of the peripheral devices is not effective. Thus, there is a need for an electronic system and a performance control method to increase the stability of hosts and peripheral devices and decrease the power consumption of the peripheral devices.

BRIEF SUMMARY OF THE INVENTION

In light of the previously described problems, the invention provides an embodiment of an electronic system, comprising a plurality of electronic devices and a control module. The electronic devices are connected in a daisy-chain configuration and overlapped in a direction, in which the electronic devices use a transport protocol compatible with a thunderbolt interface to communicate with a host. The control module generates thermal designed power values corresponding to the electronic devices according to parameters of the electronic devices and controls performances of the electronic devices according to the thermal designed power values.

The invention also provides a performance control method capable of electronic devices being connected in a daisy-chain configuration. The performance control method comprises the steps of: generating thermal designed power values corresponding to the electronic devices according to parameters of the electronic devices, wherein the electronic devices use a transport protocol compatible with a thunderbolt interface to communicate with a host; and controlling performances of the electronic devices according to the thermal designed power values to prevent the power consumed by the electronic devices from being larger than the thermal designed power value.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
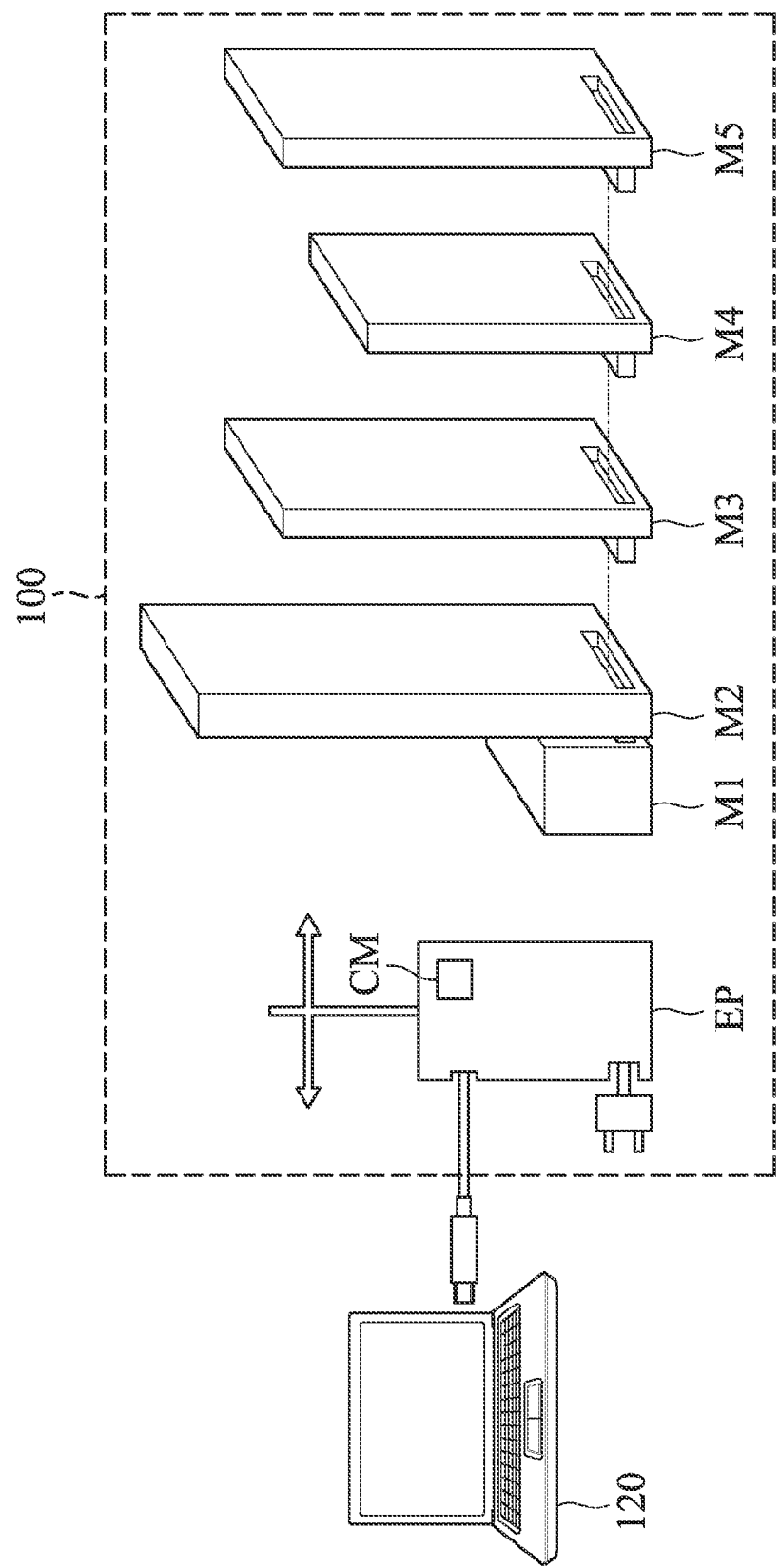
FIG. 1 illustrates an embodiment of the electronic system for performing a performance control process.

FIG. 1 illustrates an embodiment of the electronic system for performing a performance control process. As shown in FIG. 1, an electronic system 100 has electronic devices M1~M5, a control module CM, and an input/output expander EP (I/O expander). The electronic devices M1~M5 are coupled in a daisy-chain configuration and are overlapped in a direction. In addition, each of the electronic devices M1~M5 has a high speed transmission interface, e.g., a thunderbolt interface, such that the electronic devices M1~M5 use a transport protocol compatible with a thunderbolt interface to communicate with a host 120. The I/O expander EP is coupled between the host 120 and the electronic devices M1~M5 to provide power to the electronic devices M1~M5. In the embodiment, the host 120 is disposed on the outside of the electronic system 100. In some embodiments, the electronic system 100 includes the host 120. In the embodiments, the high speed transmission interfaces can be thunderbolt interfaces, but is not limited thereto. Any electronic device having high speed transmission interfaces (e.g., more than 5 Gbps) can serve as the input/output expander EP or any of the electronic devices M1~M5.

In detail, in the embodiment of the invention, any of the electronic devices M1~M5 can be any of various kinds of peripheral devices. For example, the electronic device M1 can be a TV box. The electronic device M2 can be an optical disk drive. The electronic device M3 can be a hard disk driver (HDD). The electronic device M4 can be a graphics processing unit (GPU) device. The electronic device M5 can be a speaker. Note that the number and the type of the electronic devices are provided for illustration, but are not limited thereto, any electronic device having the thunderbolt interface can serve as the input/output expander EP of the invention or any of the electronic devices M1~M5 of the invention.

The control module CM generates the thermal designed power (TDP) values respectively corresponding to the electronic devices M1~M5 according to the parameters of the electronic devices, and controls the performances (or power) of the electronic devices according to the thermal designed power (TDP) values to increase the stability of the electronic system 100.

In detail, each of the electronic devices M1~M5 has a plurality of parameters stored in a memory thereof. For example, each of the electronic devices M1~M5 has five parameters P1~P5. The parameter P1 is associated with an outward appearance of the electronic device (e.g., the electronic devices M1~M5). For example, the parameter P1 can be the aspect ratio or the lengths of an X-axis, a Y-axis and a Z-axis of the electronic device (e.g., the electronic devices M1~M5). The parameter P2 is associated with a temperature profile distribution of an X-axis, a Y-axis and a Z-axis of the electronic device (e.g., the electronic devices M1~M5). In other words, the parameter P2 indicates the temperature distribution of the X-axis, the Y-axis and the Z-axis of the electronic device. The parameter P3 is associated with an order of the electronic devices. In other words, when the electronic devices M1~M5 are connected in series, the parameter P3 means where the electronic device is placed in the group of the electronic devices M1~M5. The parameter P4 is associated with an ambient temperature of the electronic devices. The parameter P5 is associated with an identifier (ID) of the electronic devices and is corresponding to different purposes, such as TV boxes, optical disk drives, hard disk drivers, graphics processing unit devices and so on.

For example, by the parameters P1, P2, P3 and P5, the control module CM can determine whether the target electronic device is influenced by other electronic devices adjacent to the target electronic device. As shown in FIG. 1, the height of the electronic device M2 from being larger than the height of the electronic device M1. Therefore, by the parameter P1 of the electronic devices M1 and M2, the control module CM can determine that the electronic device M1 will not hinder the electronic device M2 from heat flux. In some conditions, even if the height of the electronic device M2 from being larger than the height of the electronic device M1, the electronic device M1 may hinder the electronic device M2 from heat flux because the hottest area of the electronic device M2 is near to the electronic device M1. By the parameter P2 of the electronic device M2 and the parameter P1 of the electronic device M1, the control module CM can determine that the electronic device M1 may hinder the electronic device M2 from heat flux.

The order of the electronic devices also affects heat flux of the electronic system 100. For example, in the electronic devices M1~M5, the electronic device M4 is an electronic device consuming the most power and generating the most heat energy. Thus, the electronic device M4 disposed at the first seat or the last seat of the electronic devices M1~M5 obtains the larger thermal designed power value, such that the operating range and the performance of the electronic device M4 is increased.

In the embodiment, the control module CM obtains the ambient temperature of the electronic system 100 according to the parameter P4. For example, when the electronic system 100 operates at the full speed at a high ambient temperature, the electronic system 100 is not stable. Therefore, the thermal designed power TDP calculated from the parameter P4 by the control module CM is lower when the ambient temperature of the electronic system 100 is higher. On the contrary, the thermal designed power TDP value calculated by the control module CM based on the parameter P4 is higher when the ambient temperature of the electronic system 100 is lower. Therefore, the control module CM controls the electronic system 100 according to the thermal designed power TDP value based on the parameter P4, such that the electronic system 100 operates effectively and stably.

In the embodiment, note that the host 120 may be other computer system configurations, including handheld devices, portable devices, personal digital assistant, multiprocessor-based, microprocessor-based or programmable consumer electronics, network PCs, minicomputers, mainframe computers, and the like, but is not limited thereto. The control module CM can be disposed in one of the electronic devices M1~M5, the I/O expander EP or the host 120.

Figure 2:
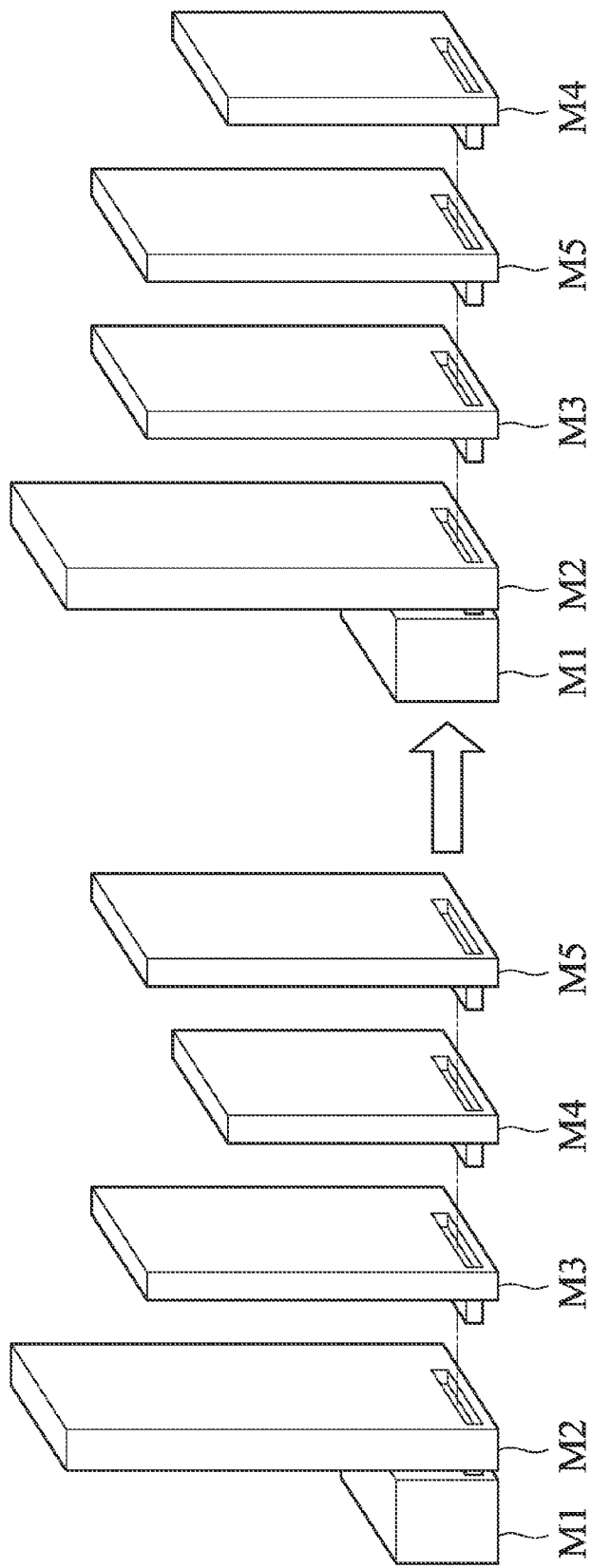
FIG. 2 illustrates an embodiment of the electronic system.

FIG. 2 illustrates an embodiment of the electronic system. As shown in FIG. 2, the control module CM computes the best order (e.g., M1-M2-M3-M5-M4) having the highest thermal designed power TDP value according to the parameters P1~P5 calculated from the current order (e.g., M1-M2-M3-M4-M5). Therefore, the user can adjust the order of the electronic devices according the best order (e.g., M1-M2-M3-M5-M4), thereby the electronic system 100 may operates effectively and stably.

In conclusion, the control module CM computes the thermal designed power value according to parameters P1~P5 of each of the electronic devices M1~M5, such that the electronic system 100 operates effectively and stably with the thermal designed power. In some embodiments, the control module CM provides the best (or better) order to users according to the parameters P1~P5, such that the users can adjust the order of the electronic devices M1~M5 according the best order to increase the thermal designed power, thereby increasing the operating power ranges of the electronic devices M1~M5, and increasing the stability and the performance of the electronic system 100.

Figure 3:
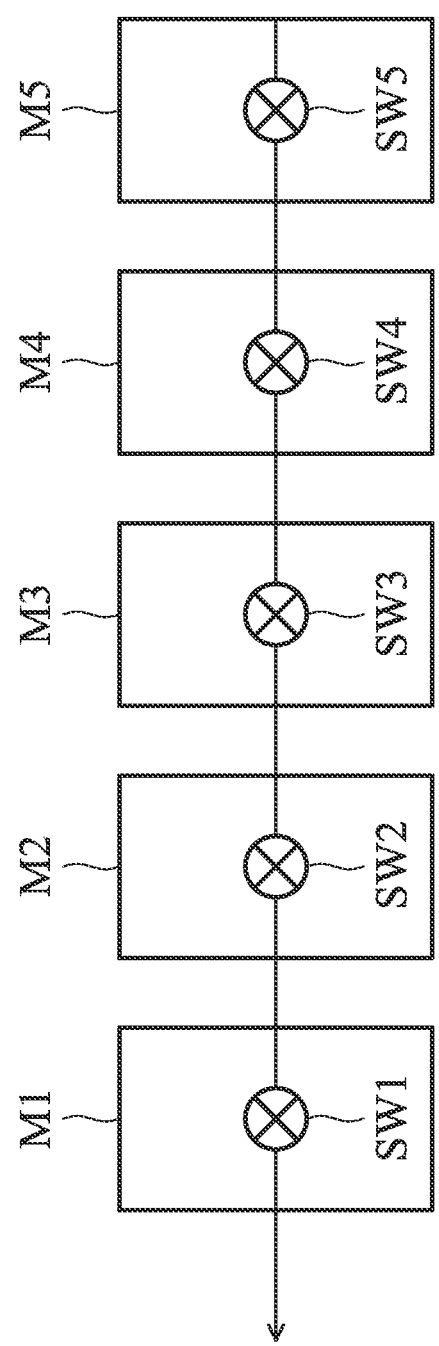
FIG. 3 illustrates a schematic view of the electronic system to illustrate the electronic devices connected in a daisy-chain configuration.

FIG. 3 illustrates a schematic view of the electronic system to illustrate the electronic devices connected in a daisy-chain configuration. As shown in FIG. 3, the switching units SW1~SW5 are disposed in the electronic devices M1~M5, respectively. In detail, when the electronic device M1 is connected to the host 120 through the I/O expander EP, the switching unit SW1 operates in an open circuit state, such that the control module CM detects that there is only the electronic device M1. Therefore, the electronic device M1 is set to the first sorted electronic device. After the control module CM completes the detections of the electronic device M1, the control module CM enables the switching unit SW1 to operate in a close circuit state, such that when the control module CM detects that there is no electronic device except for the electronic device M1, the control module CM determines that the electronic device M1 is the last sorted electronic device.

When the electronic device M2 is connected to the electronic device M1, the control module enables the switching units SW1 and SW2 to operate in the open circuit state (the switching unit SW1 is switched from the close circuit state to the open circuit state), such that the control module CM only detects the electronic device M1. Therefore, the electronic device M1 is set to the first sorted electronic device. After the control module CM completes the detections of the electronic device M1, the control module CM enables the switching unit SW1 to operate in the close circuit state, such that the control module CM detects the electronic device M2. Therefore, the electronic device M2 is set to the second sorted electronic device. After the control module CM completes the detections of the electronic device M2, the control module CM enables the switching device M2 to operate in the close circuit state, such that when the control module CM detects that there is no electronic device except for the electronic devices M1 and M2, the electronic device M2 is set to the last sorted electronic device.

By the same way, when the electronic device M3 is connected to the electronic device M2, the control module enables the switching units SW1, SW2 and SW3 to operate in the open circuit state (the switching units SW1 and SW2 is switched from the close circuit state to the open circuit state), such that the control module CM only detects the electronic device M1. Therefore, the electronic device M1 is set to the first sorted electronic device. After the control module CM completes the detections of the electronic device M1, the control module CM enables the switching unit SW1 to operate in the close circuit state, such that the control module CM detects the electronic device M2. Therefore, the electronic device M2 is set to the second sorted electronic device. When the control module CM completes the detections of the electronic device M2, the control module CM enables the switching unit SW2 to operate in the close circuit state, such that the control module CM detects the electronic device M3. Therefore, the electronic device M3 is set to the third sorted electronic device. After the control module CM completes the detections of the electronic device M3, the control module CM enables the switching unit SW3 to operate in the close circuit state, such that when the control module CM detects that there are no electronic devices except for the electronic devices M1~M3, the electronic device M3 is set to the last sorted electronic device. Details of the procedure of the other electronic devices (e.g., electronic devices M4~M5) are similar to the procedure of the electronic devices M1~M3, therefore, the details of the other electronic devices are omitted for brevity.

Figure 4:
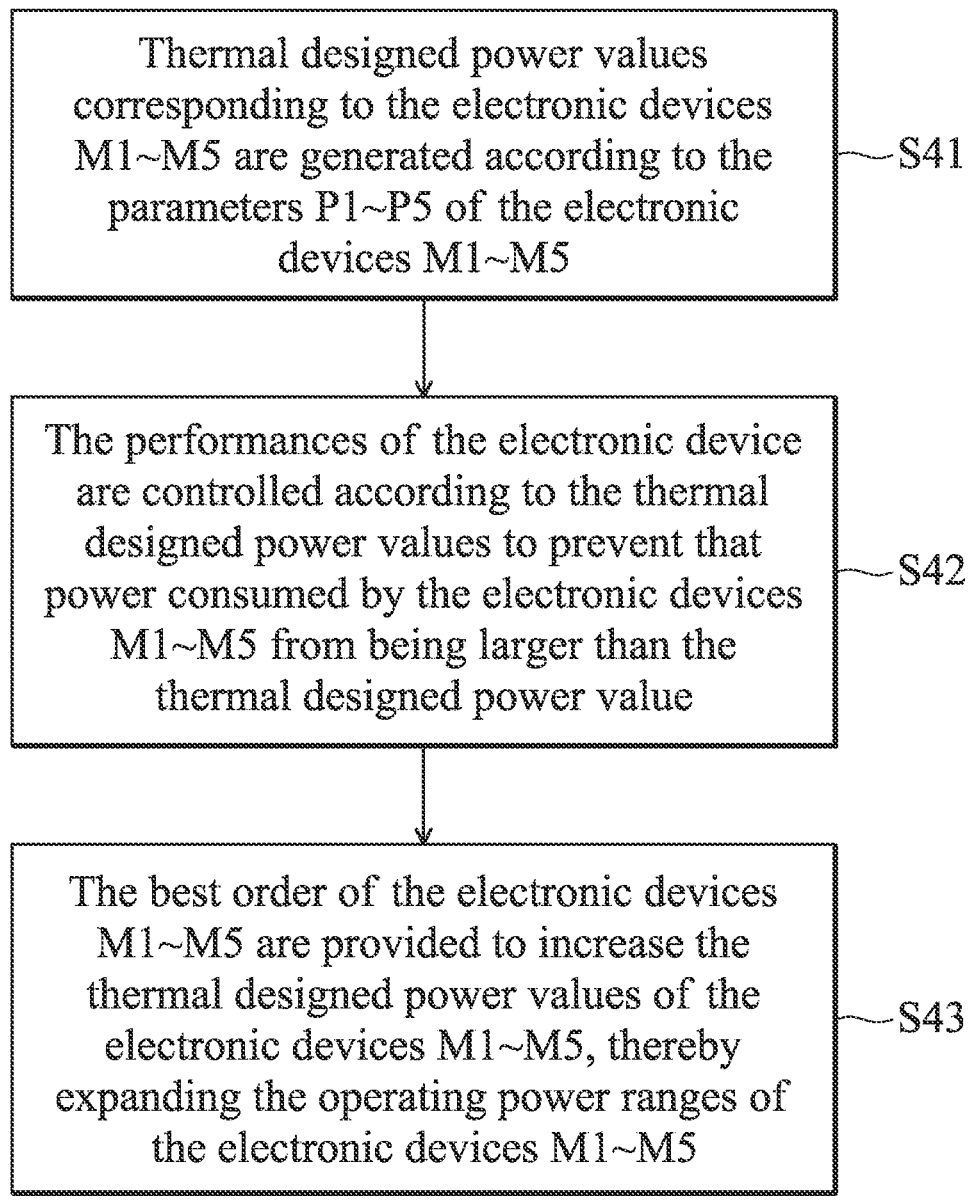
FIG. 4 illustrates a flowchart of the method for controlling performance of the invention capable of the electronic devices connected in a daisy-chain configuration.

FIG. 4 illustrates a flowchart of the performance control method of the invention capable of the electronic devices connected in a daisy-chain configuration. As shown in FIG. 4, the performance control method includes the following steps.

In step S41, thermal designed power values corresponding to the electronic devices M1~M5 are generated according to the parameters P1~P5 of the electronic devices M1~M5, in which each electronic device uses a transport protocol compatible with a thunderbolt interface to communicate with the host 120. In step S42, the performances of the electronic device are controlled according to the thermal designed power values to prevent that power consumed by the electronic devices M1~M5 from being larger than the thermal designed power value. In step S43, the best order of the electronic devices M1~M5 are provided to increase the thermal designed power values of the electronic devices M1~M5, thereby expanding the operating power ranges of the electronic devices M1~M5. In other words, the best order is the order having the largest thermal designed power values.

Figure 5A:
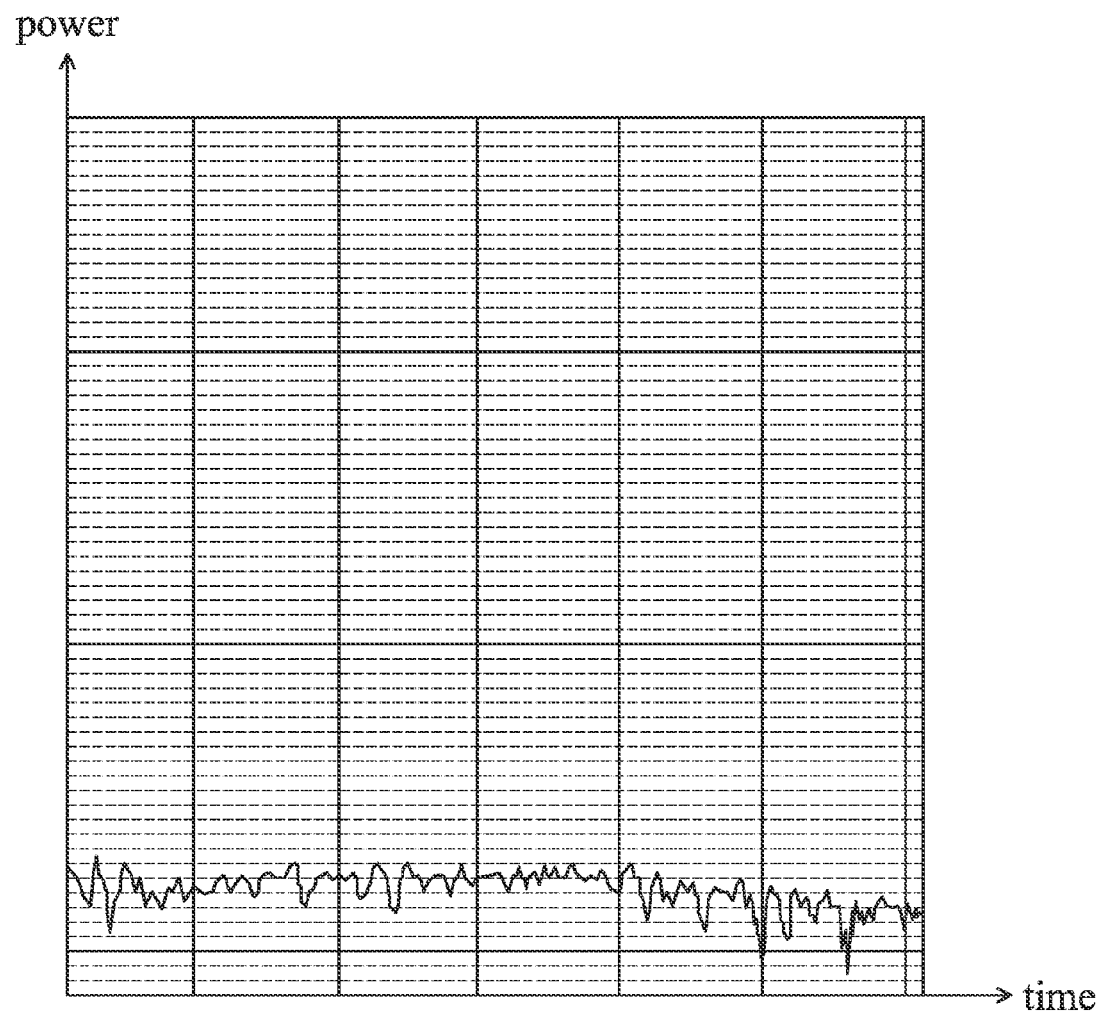
FIG. 5A illustrates an embodiment of the relationship between power and time.
Figure 5B:
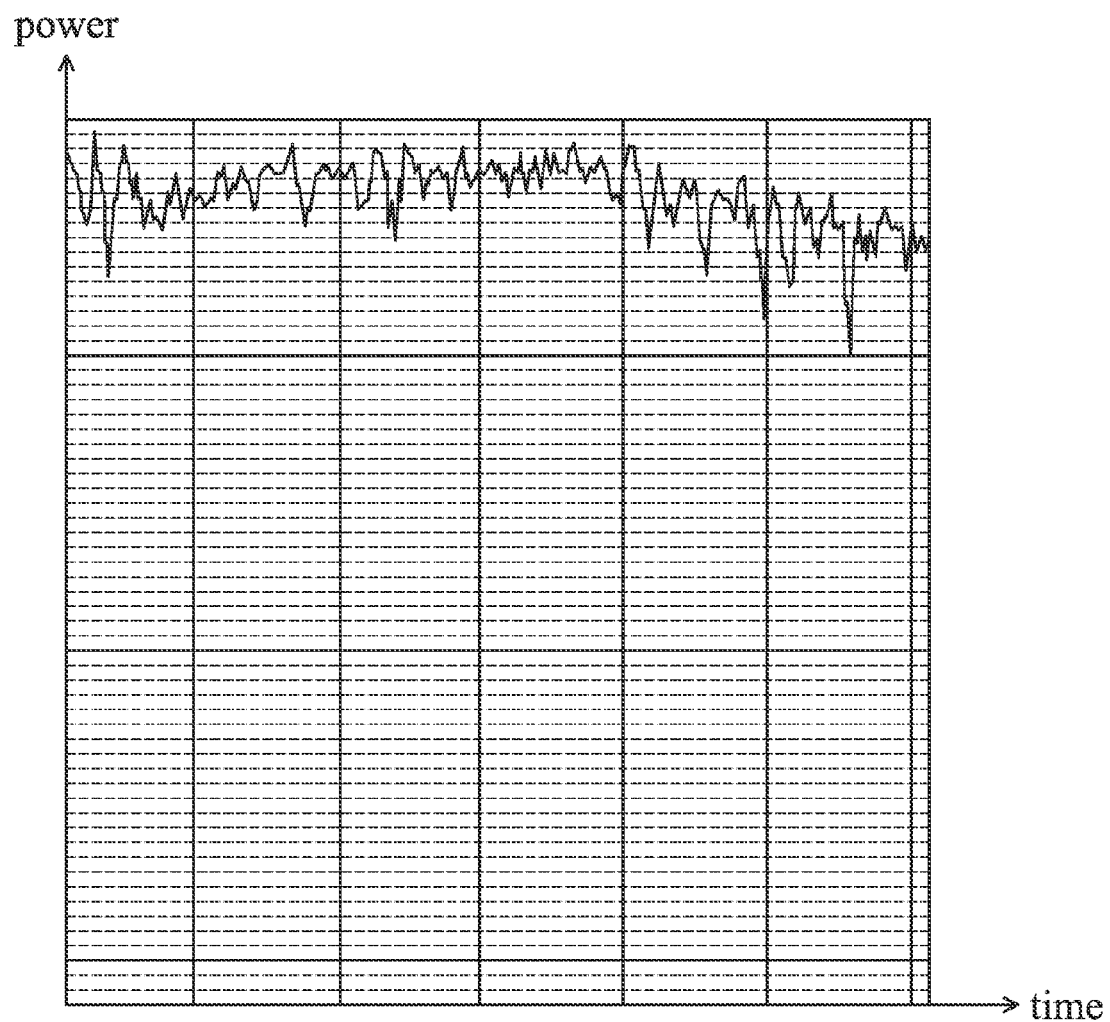
FIG. 5B illustrates an embodiment of the relationship between power and time.

FIGS. 5A and 5B illustrate embodiments of the relationship between power and time, in which the horizontal axis is time and the vertical axis is power. FIG. 5A indicates that the electronic system is operating at a low thermal designed power value. Because the power consumed by the electronic devices M1~M5 must be lower than the corresponding thermal designed power value, the operating power range of the performance of the electronic devices M1~M5 is smaller. FIG. 5B indicates the electronic system is operating at a high thermal designed power value. In FIG. 5B, the operating power range of the performance of the electronic devices M1~M5 is larger because of the increase of the thermal designed power value.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An electronic system, comprising:
a plurality of electronic devices, connected in a daisy-chain configuration and overlapped in a direction, wherein the electronic devices use a transport protocol compatible with a thunderbolt interface to communicate with a host; and
a control module, generating thermal designed power values corresponding to the electronic devices according to parameters of the electronic devices and controlling performances of the electronic devices according to the thermal designed power values, wherein the parameters comprise an arrangement order of the electronic devices; and
wherein the control module provides the best arrangement order of the electronic devices to increase the thermal designed power value, thereby expanding the operating power ranges of the electronic devices.

2. The electronic system as claimed in claim 1, wherein the parameters comprise lengths of an X-axis, an Y-axis and an Z-axis of the electronic devices.

3. The electronic system as claimed in claim 1, wherein the parameters comprise temperature profiles distributions of an X-axis, an Y-axis and an Z-axis of the electronic devices.

4. The electronic system as claimed in claim 1, wherein the parameters comprise an ambient temperature of the electronic devices.

5. The electronic system as claimed in claim 1, wherein the parameters comprise an identifier of the electronic devices.

6. The electronic system as claimed in claim 1, wherein the control module is disposed in the electronic devices, an input/output expander or the host.

7. A performance control method, capable of electronic devices being connected in a daisy-chain configuration, comprising:
generating thermal designed power values corresponding to the electronic devices according to parameters of the electronic devices, wherein the electronic devices use a transport protocol compatible with a thunderbolt interface to communicate with a host, wherein the parameters comprise an arrangement order of the electronic devices;
controlling performances of the electronic devices according to the thermal designed power values to prevent the power consumed by the electronic devices from being larger than the thermal designed power value; and
adjusting the arrangement order of the electronic devices to increase the thermal designed power value, thereby expanding operating power ranges of the electronic devices.

8. The performance control method as claimed in claim 7, wherein the parameters comprise lengths of an X-axis, an Y-axis and an Z-axis of the electronic devices.

9. The performance control method as claimed in claim 7, wherein the parameters comprise temperature profiles distributions of an X-axis, an Y-axis and an Z-axis of the electronic devices.

10. The performance control method as claimed in claim 7, wherein the parameters comprise an order of the electronic devices.

11. The performance control method as claimed in claim 7, wherein the parameters comprise an ambient temperature of the electronic devices.

12. The performance control method as claimed in claim 7, wherein the parameters comprise an identifier of the electronic devices.

13. The performance control method as claimed in claim 7, further comprising providing the best arrangement order of the electronic devices to increase the thermal designed power value, thereby expanding operating power ranges of the electronic devices.

* * * * *